United States Patent [19]

Yagi et al.

[11] Patent Number: 5,197,540

[45] Date of Patent: Mar. 30, 1993

[54] BORING DEVICE FOR LINING MATERIAL IN BRANCHED PORTIONS OF LINED CONDUIT

[75] Inventors: Isaburo Yagi, Amagasaki; Hideo Maruyama, Osaka; Masaru Yamakawa, Kobe; Yoshifumi Osaka, Settsu, all of Japan

[73] Assignee: Ashimori Kogyo Kabushiki Kaisha, Osaka, Japan

[21] Appl. No.: 283,598

[22] PCT Filed: Apr. 14, 1988

[86] PCT No.: PCT/JP88/00372

§ 371 Date: Nov. 28, 1988

§ 102(e) Date: Nov. 28, 1988

[87] PCT Pub. No.: WO88/07919

PCT Pub. Date: Oct. 20, 1988

[30] Foreign Application Priority Data

| Apr. 14, 1987 | [JP] | Japan | 62-56380[U] |
| Apr. 14, 1987 | [JP] | Japan | 62-56382[U] |
| Apr. 14, 1987 | [JP] | Japan | 62-56383[U] |
| Apr. 14, 1987 | [JP] | Japan | 62-56384[U] |

[51] Int. Cl.$^5$ ............................................. E03F 3/06
[52] U.S. Cl. ...................................... 166/55.8; 408/21; 408/130; 409/143
[58] Field of Search ............... 29/566, 566.1; 409/143; 408/77, 79, 88, 89, 130, 21; 166/55.6, 55.7, 55.8, 66, 254, 252

[56] References Cited

U.S. PATENT DOCUMENTS

| 4,197,908 | 4/1980 | Davis et al. | 409/143 X |
| 4,222,687 | 9/1980 | Williams | 408/79 |
| 4,442,891 | 4/1984 | Wood | 409/143 X |
| 4,577,388 | 3/1986 | Wood | 409/143 X |
| 4,630,676 | 12/1986 | Long, Jr. | 409/143 X |
| 4,648,454 | 3/1987 | Yarnell | 166/55.7 X |
| 4,986,314 | 1/1991 | Himmler | 166/55.7 X |

FOREIGN PATENT DOCUMENTS 58-22209 2/1983 Japan.
61-179724 8/1986 Japan.

Primary Examiner—Z. R. Bilinsky

[57] ABSTRACT

The present invention relates to a boring device adapted to bore the lining material blocking a branched portion where there is an opening for connecting a main pipeline with a branched pipeline (33), after the inner surface of a pipe (31), such as a gas conduit, a city water conduit or a sewerage pipe, in particular, a conduit buried in the ground, has been lined with lining material (30) for maintenance, repairs and reinforcement purposes.

The features of the boring device reside in improvements of the mode of attachment of the television camera (8) for projecting the position of the leading end of the borer (28) on its screen, the mode of attachment of the borer (28) to the body (9), the driving system of the borer (28), and also of the cutting blades of the borer (28) for cutting off the lining material.

7 Claims, 9 Drawing Sheets

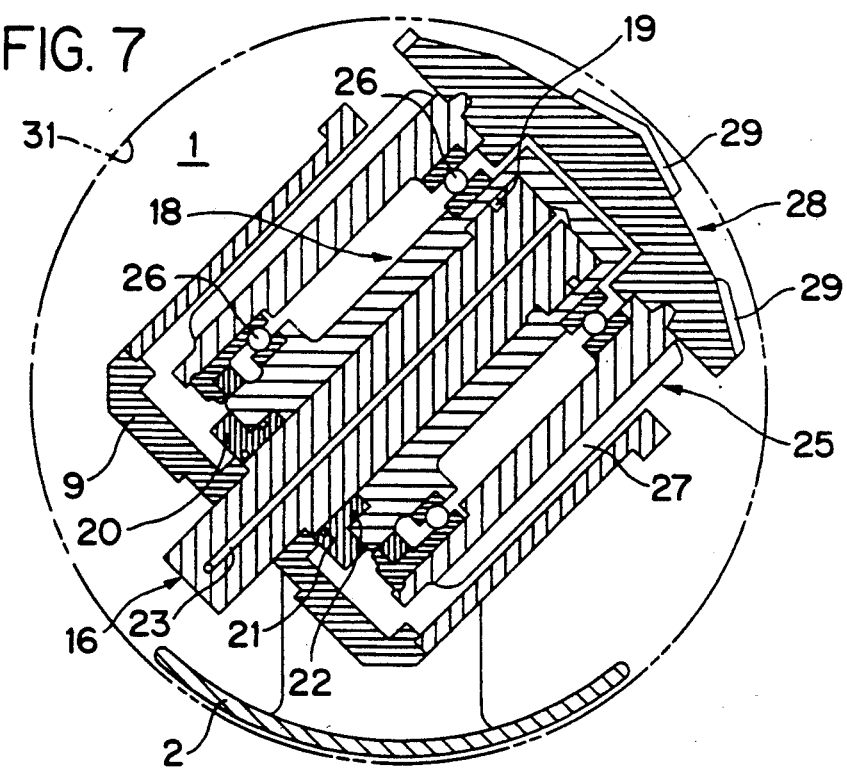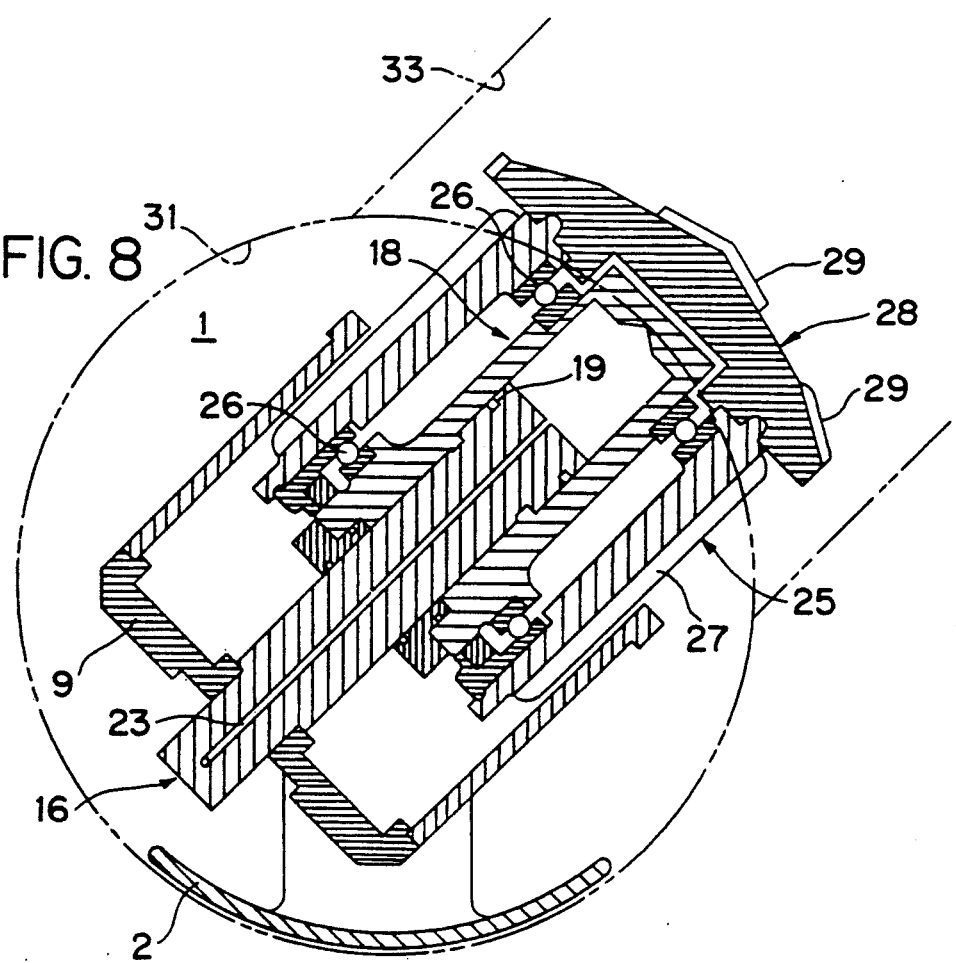

FIG. 16-A
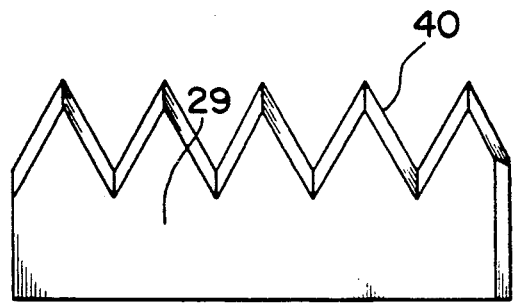
FIG. 16-B
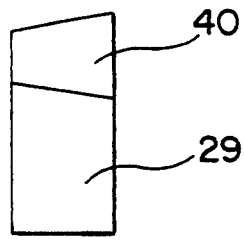
FIG. 16-C
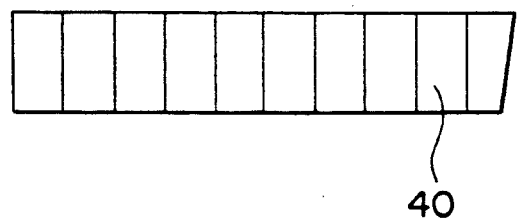

BORING DEVICE FOR LINING MATERIAL IN BRANCHED PORTIONS OF LINED CONDUIT

TECHNICAL FIELD

The present invention relates to a boring device for a lining material in a pipeline such as a gas conduit, a city water pipeline, a sewer conduit and particularly an underground pipeline. More particularly the present invention is directed to a device for boring holes in the lining material leading to branched portions of a pipeline after the lining has been applied onto the inner surface of the main pipeline for maintenance/repairs and reinforcement purposes to thereby provide communication between the branched pipelines and main pipeline.

BACKGROUND ART

In general, most of the various kinds of conduits such as gas conduits, city water pipelines and sewers etc., as mentioned above, have a number of branched pipelines extending therefrom in regions close to the terminal ends thereof. For example, low pressure pipelines of gas conduits are buried in the ground under city roads to supply city gas through branched pipelines to neighboring houses or buildings. Many branched pipelines extend from a main pipeline at intervals of short distances. Further, the above-mentioned situation on the distribution of branched pipelines at terminal ends of gas main conduits is also applicable in the case of city water pipelines and conduits, for sewerage.

It is well known to apply a tubular lining material to the inner surfaces of such pipelines or conduits for the purpose of repairing or reinforcing them. Examples of such a lining method for pipelines are described, for example, in U.S. Pat. Nos. 4,368,091 and 4,334,943 wherein a tubular lining material made of a flexible material which has been applied to the inner surface thereof with a binder or adhesive is fixedly secured in an annular form at one end of a pipeline, and a fluid pressure is applied to the back of the annularly fixed portion to form a turning, point where the lining material is turned inside out. This allows the turning point to advance successively within the pipeline and reach the other end thereof by the action of the fluid pressure thereby inserting the evaginating lining material into the pipeline while the surface of the lining material which has been applied with the adhesive is being pressed against the inner surface of the pipeline. The adhesive is interposed in between their inner surfaces, and is solidified to effect bonding.

In the case where the inner surface of such a pipeline is applied with a lining material, the openings in the main pipeline from which the branched pipelines extend; that is the branched portions of the pipeline will also be lined so that the openings or passages leading to the branched pipelines will be blocked by the lining material. Accordingly, it is necessary to bore or port the lining material blocking the branched portions where the branched pipelines are connected to the main pipeline, after the lining process, to provide communication between the branched pipelines and the main pipeline.

PRIOR ART

As for the devices for boring the lining material applied to the inner surface of a pipeline in the above-mentioned case, there are known those described, for example, in Japanese Laid-open Utility Model Application Nos. SHO 56-158588, SHO 56-158590, SHO 56-158591, SHO 57-48391, SHO 57-46189, SHO 58-22209, SHO 58-27009, SHO 58-106198, SHO 61-18891, Japanese Laid-open Patent Application Nos. SHO 56-141491, SHO 61-179724, U.S. Pat. Nos. 4,197,908, 4,442,891 and 4,577,388, and U.K. Patent No. 2,095,598, respectively.

These prior, art devices are more or less different in construction. However, all of them are arranged such that a boring device provided with a borer such as a punch or drill is advanced in a pipeline, and they comprise means for the fine adjustment of the position of the borer in the circumferential direction so that, the borer may be aligned with a branched portion of the pipeline. A television camera is also provided for monitoring and confirming the boring position and the condition of the boring operation which is being made by means of the borer. The boring device is inserted in the pipeline and is located at a position where the leading end of the borer is aligned with the branched portion, and then the lining material applied to the inner surface of the pipeline in the branched portion is bored by means of the borer from inside of the main pipeline towards the branched pipe.

However, these, prior art devices have the following disadvantages noted in paragraphs (1) to (5) below.

(1) Since in these prior art devices the television camera and the borer are arranged to be driven independently, it is difficult to locate the borer accurately at a branched portion of the main pipeline from which a branched pipeline extends. Thus, even if the detection of the position of the branched portion is made by means of the television camera, it is not always possible to project the borer on the screen of the television camera. Therefore, in order to locate the borer at the branched portion in the main pipeline, the borer must be moved to a position where its image may be viewed on the screen of the television camera by effecting a sightless operation.

Further, if it is desired to investigate a branched portion in the main pipeline by the operator while the borer is projected on the screen of the television camera, then detection must be made by simultaneously moving a mechanism for fine adjustment of the position of the borer and a television camera driving mechanism, and therefore the operation per se is difficult.

(2) Since each of the prior art boring devices is arranged to bore the lining material in the state where it is supported on the lower, inner surface of the pipeline, the boring device is in an unstable condition. Thus, there is a risk of the boring device turning over or slipping out of place. In the case where branched pipelines extend from the upper, inner surface of the main pipeline, there is no significant problem, whereas in the case where the main pipeline has branched pipelines extending from one side thereof, it is difficult to bore the lining material by means of any of these boring devices. Stating in brief, in this case, the boring device is supported, as a matter of course, on the lower, inner surface of the pipeline, and so if the borer is directed to one side so as to bore the lining material in that condition, then the entire boring device is turned over by the action of a reaction force generated when boring the lining material.

Further, there has been devised a boring device having a skid or rotating wheels mounted on the body thereof so as to extend in the entire circumferential direction to support the boring device on the entire inner peripheral surface of a pipeline. However, in order to enable this boring device to follow up the irregularities of the inner surface of the pipeline or adapt to changes in the inside diameter thereof, such skids or rotating wheels need to be mounted in such a manner that they can be projected from and withdrawn towards the boring device body. Therefore, the boring device cannot be supported on the inner surface of the pipeline in a stable condition.

Further, in order to enable the boring device to pass through the pipeline regardless of changes in the diameter of the pipeline or the irregularities of the inner surface thereof, it is necessary to make the size of the boring device sufficiently smaller than the inside diameter of the pipeline, which results in a considerable spacing between the borer and the inner surface of the pipeline. Hence, in the case where the lining material is to be bored, the borer has to be moved over a distance longer than the above-mentioned spacing, thus rendering it difficult to set the position of the borer and making the direction of the leading end thereof unstable. Japanese Laid-open Patent Application No. SHO 61-179724 discloses an arrangement wherein a boring device is adapted to be raised by extending its legs downwardly at a position where the boring operation is to be carried out. However, in this arrangement, when the boring operation is made, the boring device cannot be fixedly secured in a stable condition and there is a substantially possibility of the boring device turning over.

(3) As for borers for use in the prior art boring devices, there is the hammer shaped striker type borer adapted to break the lining material in a branched portion (as described, for example, in Japanese Laid-open Utility Model Application No. SHO 56-158588, and the heating iron type borer adapted to burn out the lining material in a branched portion (as described, for example, in Japanese Laid-open Utility Model Application No. SHO 61-188091) etc. In the former case, it is necessary to provide an extremely high impact to the tough lining material to break it, thus rendering the size of the boring device unavoidably larger and bringing about a possibility of the pipeline, being damaged. In the latter case, there is the possibility of heat deterioration of the lining material in the vicinity of the portions to be burnt out. Therefore, both of these systems cannot be said to be satisfactory. As for other types of borers, there are rotary borers as described in Japanese Laid-open Utility Model Application Nos. SHO 58-27009 and SHO 58-106198. These borers are preferable for use in the boring devices of this kind. However, these borers are required to be projected and withdrawn radially of the pipeline while they themselves are being rotated. In the device disclosed in the above-mentioned Japanese Laid-open Utility Model Application No. SHO 58-27009, a borer is mounted on a gear, driven by means of a motor in such a manner that it may be slidably moved by means of a plunger and rotated integrally therewith. Such a supporting mechanism becomes inevitably very complicated in construction, and is also disadvantageous in that the stroke of sliding of the borer is limited due to the restriction in the space between the supporting points at both ends thereof. Also, the height of projection of the borer is limited when the boring operation is made.

Further, in the boring device as described in Japanese Laid-open Utility Model Application No. SHO 58-106198, a borer is housed in a plunger adapted to be rotatively driven by means of a motor, and is arranged to be moved forwards and backwards by means of the plunger and a spring. In this device, the plunger and the spring need to be located in the rear of the borer, and therefore it is impossible to project and withdraw the borer with a large stroke.

In general, in case a pipeline having branched portions is applied with a lining material, not only are the openings for branched pipelines formed in the main pipeline blocked by the lining material, but also a part of the adhesive for adhesively bonding, the lining material to the pipeline tends to flow into the branched pipelines and solidify therein thus partially blocking them. Therefore, in these boring devices, it is necessary not only to cut away the lining material in each of the branched portions by means of the borer, but also to allow the borer to advance to some extent into each of the branched pipelines and remove the solidified adhesive mass.

Nevertheless, the above-mentioned boring is not completely satisfactory, since such a borer whose stroke of projection is limited can serve only to cut away the lining material, but cannot make its entry into the branched pipeline and remove the solidified adhesive layer therein.

(4) In case a conical drill as shown in Japanese Laid-open Patent Application No. SHO 61-179724 is used as a borer, it is difficult to make the diameter of the drill large enough to match the inside diameter of a branched pipeline. Further, in case a hole-saw type drill as shown in Japanese Laid-open Utility Model Application No. SHO 58-106198 is used, disk-shaped chips are produced when effecting boring operation, and so each time a boring operation is finished it is required to remove the borer and remove the chips, thus lowering the operational efficiency.

(5) In the boring device of the type using a rotary drill to bore the lining material, since the diameter of a hole to be made is limited by the diameter of the drill, it is difficult to make a hole whose diameter corresponds to the inside diameter of the relevant branched pipeline. Although it is possible to make a hole having a sufficiently large diameter by means of a drill with a large diameter matching the inside diameter of the branched pipeline, it is necessary to align the center line of the drill with that of the branched pipeline, thus causing the possibility of the main pipeline and branched pipelines being damaged by the drill.

Furthermore, it is impossible for the above-mentioned striker type and heating iron type borers to advance into the pipeline and clear away the solidified adhesive mass therein. Further, even the aforementioned drill type borer can only penetrate and bore the solidified adhesive mass, but cannot remove the solidified adhesive mass in the periphery of the hole. In view of the above-mentioned circumstances, in the technical field of lining for maintenance, repairs and reinforcement of pipelines, there has been a strong demand for the development of a boring device wherein the device can be moved in a pipeline so as to locate its borer accurately at a branched portion, and the lining material in the branched portion is bored by means of the borer by a simple operation to form an opening whose diameter is equal to that of the branched pipeline without damaging the pipeline or the lining material, and whereby removal of extra adhesive layer and disposal of chips resulting from the boring can be advantageously achieved.

SUMMARY OF THE INVENTION

The present invention has for its object to provide a novel type boring device for a lining material applied to the inner surface of a pipeline which overcomes all the disadvantages attendant on the prior art boring devices.

Another object of the present invention is to provide a boring device for a lining material applied to the inner surface of a pipeline, wherein the device is movable in the pipeline and can bore the lining material in a branched portion so as to form an opening whose diameter is equal to the inside diameter of a branched pipeline, without causing any difficulty due to chips of the lining material due to the boring operation and the solidified adhesive mass remaining therein.

A further object of the present invention is to provide a boring device for a lining material applied to the inner surface of a pipeline, wherein the device is movable in the pipeline and can be supported rigidly on the inner surface thereof so that it may bore the lining material in a stable condition, and wherein the position of the opening for a branched pipeline to be formed thereby can be readily set.

A still further object of the present invention is to provide a boring device for a lining material applied to the inner surface of a pipeline, wherein the device is movable in the pipeline and comprises a driving mechanism which can project and withdraw a rotary borer in the form of a cutting tool having a simple construction with a sufficiently large stroke.

An even further object of the present invention is to provide a boring device for a liner applied to the inner surface of a pipeline, wherein the device is movable in the pipeline and is arranged such that a mechanism for fine adjustment of a borer and a television camera can be driven as an integral unit and the borer can be located easily in a branched portion of the pipeline.

The present invention provides, with a first object to overcome the disadvantage of the prior art as described in the above-mentioned Item (1), a boring device for a lining material applied to the inner surface of a pipeline, wherein the device can be located easily in a branched portion by driving a mechanism for fine adjustment of the position of the borer, and a television camera as an integral unit.

The present invention provides, with a second object to overcome the disadvantage of the prior art as described in the above-mentioned Item (2), a boring device for a lining material applied to the inner surface of a pipeline, wherein the device can be supported rigidly, on the inner surface of a pipeline at a position where the boring operation is to be made so that it may bore the lining material always in a stable condition and the position of the borer relative to the portion of the lining material to be bored can be set very easily.

The present invention provides, with a third object to eliminate the disadvantage of the prior art as described in the above-mentioned Item (3), a driving mechanism for a borer for a lining material applied to the inner surface of a pipeline, wherein the driving mechanism is simple in construction and is capable of projecting and withdrawing a rotary borer with a sufficiently large stroke and advancing it deep into a branched pipeline even in the case where an adhesive made its entry thereinto and solidified, and then removing the solidified adhesive mass so as to ensure that the branched pipeline communicates with the main pipeline.

The present invention provides, with a fourth object to eliminate the disadvantage of the prior art as described in the above-mentioned Item (4), a boring device for a lining material applied to the inner surface of a pipeline, wherein the device is capable of boring the lining material in a branched portion so as to form an opening whose diameter is equal to the inside diameter of a branched pipeline extending from the branched portion, without damaging the pipeline or the lining material and without causing any difficulty due to chips of the lining material resulting from the boring operation.

The present invention provides, with a fifth object, to overcome the disadvantage of the prior art as described in the above-mentioned Item (5), a boring device for a lining material applied to the inner surface of a pipeline, wherein the device is capable of boring the lining material in a branched portion so as to form an opening whose diameter is equal to the inside diameter of a branched pipeline extending from the branched portion, without damaging the pipeline or the lining material and without causing any difficulty due to chips of the lining material resulting from the boring operation. An arrangement is made such that even in the case where the branched pipeline is clogged with solidified adhesive mass, the adhesive mass can be removed effectively and efficiently.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIGS. 7 and 8 are sectional views taken along line IV—IV of FIG. 2 in the operating process of the boring device;

FIGS. 16A, 16B and 16C show a plan view, a side view and an end view, respectively, of the cutting blade.

A first boring device according to the present invention is characterized by being supported on a skid, which is movable in a pipeline, in such a manner that it may be moved forwards and backwards relative to the skid and may be turned about an axis of turning extending in parallel with the central axis of the pipeline. A borer is mounted on the boring device body in such a manner that it may be projected into and withdrawn radially of the pipeline, and also a television camera is mounted on the boring device body in such a manner that it may be moved and turned as an integral unit with the boring device body, with the television camera being directed to the leading end of said borer.

Figure 1:
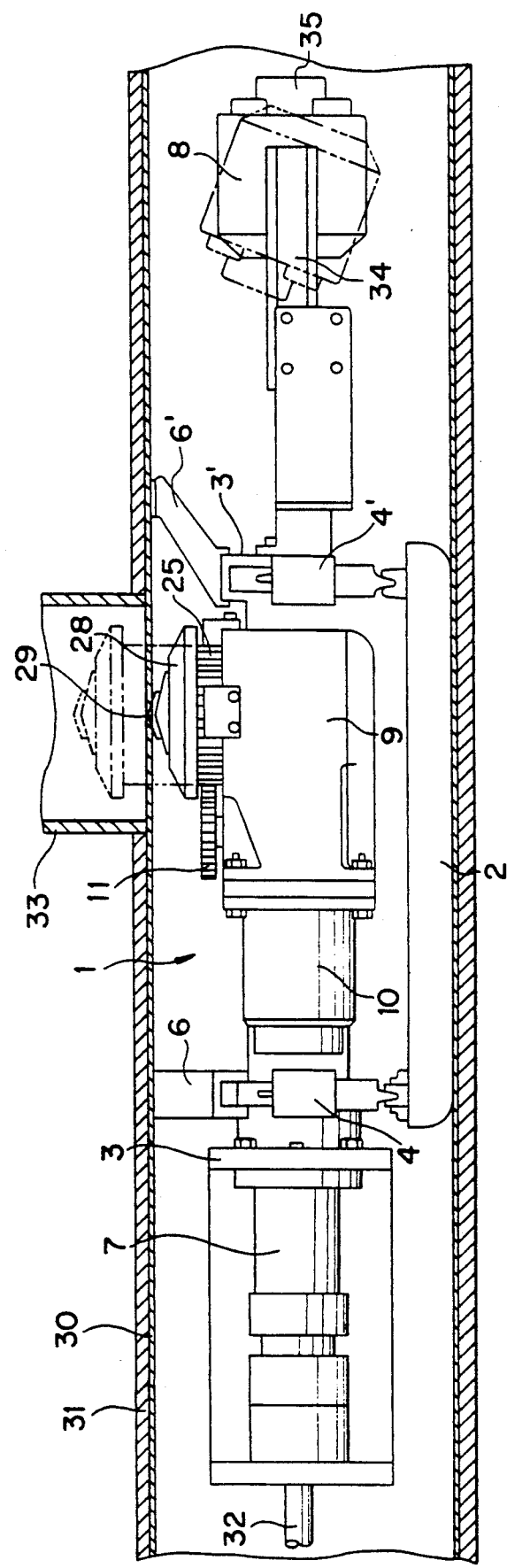
FIG. 1 shows in a side elevational view, one embodiment of the boring device of the present invention positioned within a conduit.

This boring device is shown in FIG. 1. Referring to FIG. 1, reference numeral 1 denotes a boring device, and 2 a skid on which the boring device 1 is mounted. The boring device 1 is arranged to be slidably moved by means of the skid 2 along the inner surface of a pipeline in the longitudinal direction thereof. Frames 3 and 3' are mounted on the abovementioned skid 2 in such a manner that they may be moved up and down by means of hydraulic jacks 4, 4', respectively, relative to the skid 2. Outriggers 6 and 6' are attached to the upper parts of the frames 3 and 3', respectively, and an actuator 7 is fixedly secured to the rear part of the frame 3.

In FIG. 1, reference numeral 9 denotes the body of the boring device. The body 9 is supported by the above-mentioned frames 3 and 3' and mounted on the leading end of the actuator 7. The arrangement is made such that the boring device body 9 may be slidably moved forwards and backwards and turned about its axis of rotation extending in parallel with the central axis of the pipeline by means of the actuator 7 relative to the frames 3 and 3'. Further, a hydraulic motor 10 is operatively mounted on the boring device body 9.

Reference numeral 11 denotes a gear journalled rotatably on the body 9. The gear 11 is adapted to be driven by means of the above-mentioned hydraulic motor 10 about a radial axis of the pipeline which is the axis of rotation thereof. The gear 11 is projected from the upper surface of the body 9.

Reference numeral 25 indicates a spindle gear mounted on the body 9 in such a manner that it may be rotated relative to the body 9 and may be projected and withdrawn radially of the pipeline or vertically in the drawing. The spindle gear 25 has gear teeth formed on the outer peripheral surface thereof, which meshes with the above-mentioned gear 11. Therefore, the spindle gear 25 is arranged such that it may be projected and withdrawn radially of the pipeline while it is being rotatively driven by means of the hydraulic motor 10 through the gear 11.

Reference numeral 28 denotes a borer in the form of a cutting, tool fixedly secured to the spindle gear 25, have cutting blades 29 mounted thereon so as to project from the upper surface thereof, the cutting blades 29 serving to cut out the lining material covering the branched portion in the pipeline to form an opening which leads to a branched pipeline.

The boring device has a television camera 8 mounted on the leading end thereof in such a manner that it may be turned freely forwards and backwards. Stating more specifically, the television camera 8 is mounted on an attachment member 34 which is mounted in turn integrally to the above-mentioned body 9. Therefore, the arrangement is made such that when the body 9 is moved longitudinally or turned relative to the frames 3 and 3' the television camera 8 is also correspondingly moved or turned as an integral unit with the body 9.

In the embodiment shown in the drawings, the arrangement is made such that the television camera 8 may be turned forwardly and backwardly relative to the attachment member 34, and when the television camera 8 is turned forwardly to allow its lens 35 to be directed forwardly a branched portion to be bored is investigated by the camera 8 while the boring device 1 is advanced in the pipeline so that the approximate position of the branched portion can be determined whereas when the camera 8 is turned backwardly, the lens 35 is directed to the leading end of the borer 28 so that the image of the borer 28 can always be projected or captured on the screen of the television camera.

Further, in FIG. 1, reference numeral 31 denotes a pipeline, 33 a branched pipeline, and 30 a lining material which has been applied onto the inner surface of the pipeline 31. Thus, in order to bore the lining material 30 which has been applied onto the inner surface of pipeline 31 in the branched portion by means of this device, the boring device 1 is first inserted into the lined pipeline 31 and advanced therein by means of a rod 32 or the like. The boring device 1 is advanced in the pipeline 31 while the inside surface of the pipeline is being investigated by means of the television camera 8 held at its forward-directed position, and the boring device 1 is stopped when it has reached nearly the position of the branched pipeline 33. Further, as for the means for advancing the boring device 1, it is not limited to pushing it forwards by means of the rod 32, and instead the boring device may be pulled forwardly, for example, by means of a wire etc.

Subsequently, the hydraulic jacks 4 and 4' are actuated to push up the frames 3 and 3' so as to allow the outriggers 6 and 6' to be thrusted against the upper, inner surface of the pipeline 31 thereby fixedly securing the boring device 1 thereto. This state is shown by solid lines in FIG. 1.

After that, the television camera 8 is turned backwardly so as to allow its lens 35 to be directed to the leading end of the borer 28, as shown by chain lines in FIG. 1. In this condition the actuator 7 is actuated as occasion demands to move the body 9 forwards or backwards and turn it so as to align the borer 28 with the branched pipeline 33.

Figure 2:
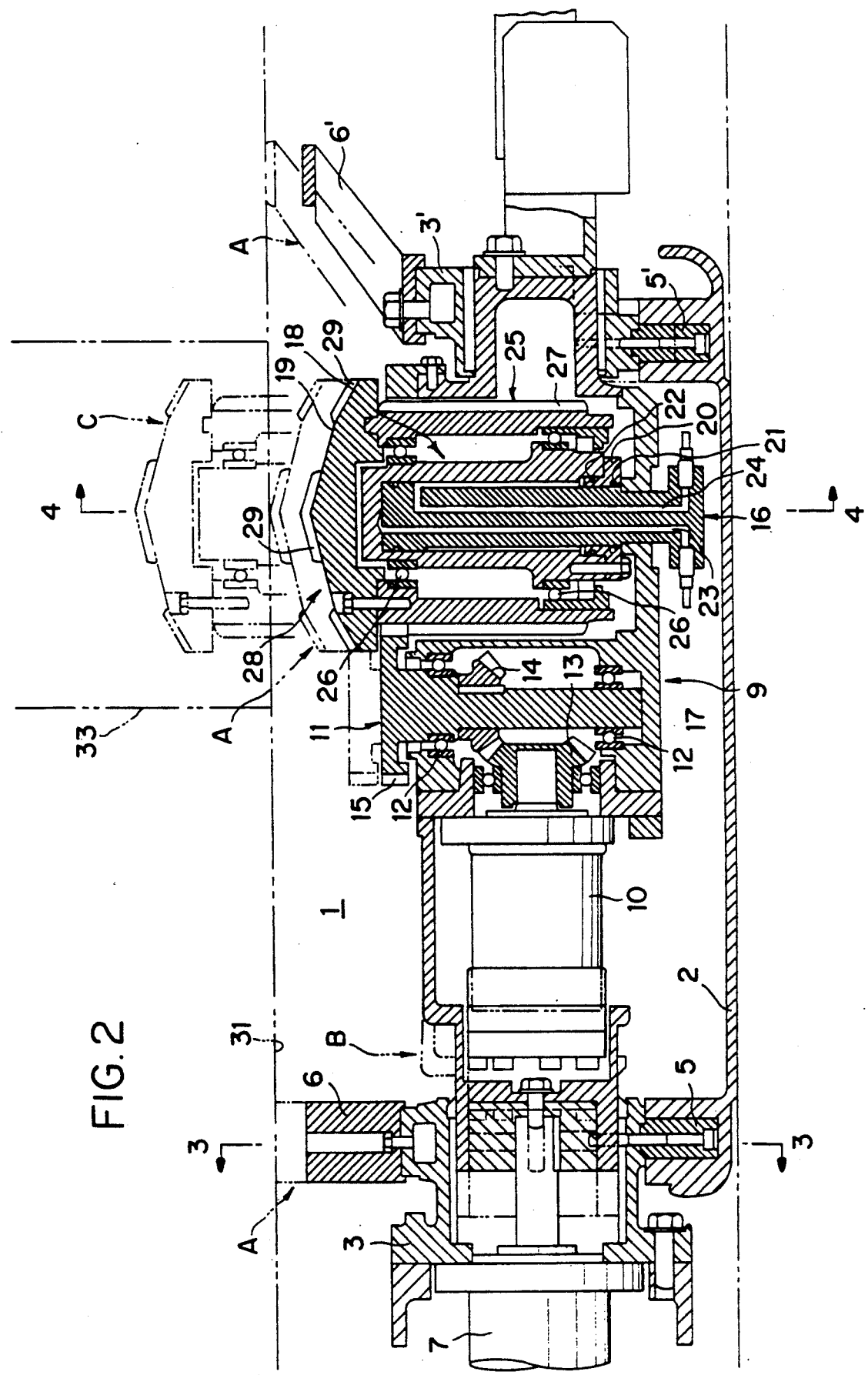
FIG. 2 is a central, longitudinal, sectional view of another embodiment of the boring device of the present invention.

In FIG. 2, reference numerals 5,5' denotes sliding bosses, 12 ball bearings, 13,14 bevel gears, 15 a gear portion, 16 a piston rod, 17 a rotating shaft, 18 a spindle, 19,21,22 "O" rings, 20 a collar, 23,24 fluid passages, 26 ball bearings, and 27 gear teeth. The other reference numerals used in this drawing nidicate component parts, respectively, denoted by the same reference numerals indicated in FIG. 1.

Figure 3:
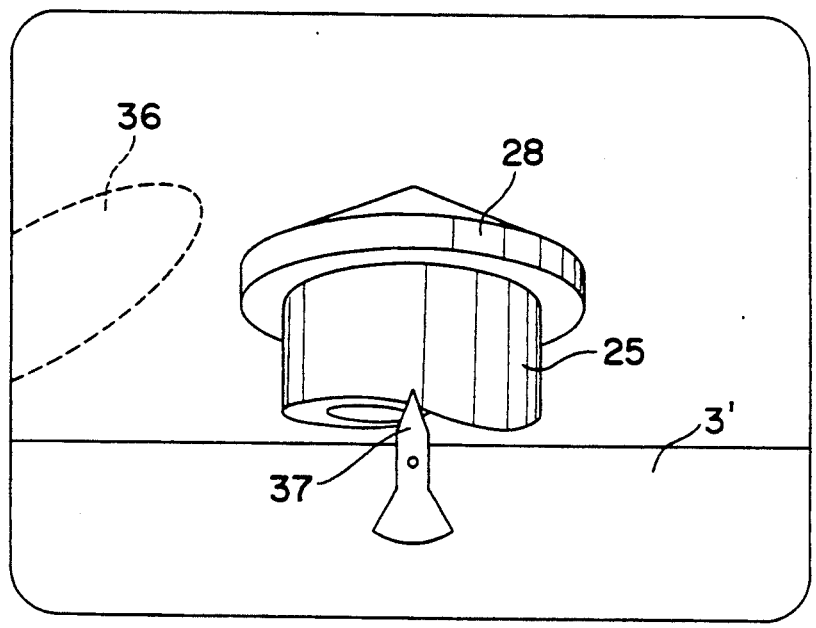
FIG. 3 diagrammatically shows the screen of a television camera wherein a branched portion of a pipeline is being investigated.

FIG. 3 shows the screen of the television camera in the condition where the television camera 8 is directed to the leading end of the borer 28. In FIG. 3, a branched portion 36 in the pipeline 31 where the branched pipeline 33 is connected is seen to the left on the screen, which represents that the borer 28 is not aligned with the branched portion 36. Further, reference numeral 37 denotes a pointer mounted on the attachment member 34 in such a manner that it may be turned freely, the leading end of which is always directed upwardly or vertically (in the direction reverse to that of the force of gravity).

Figure 4:
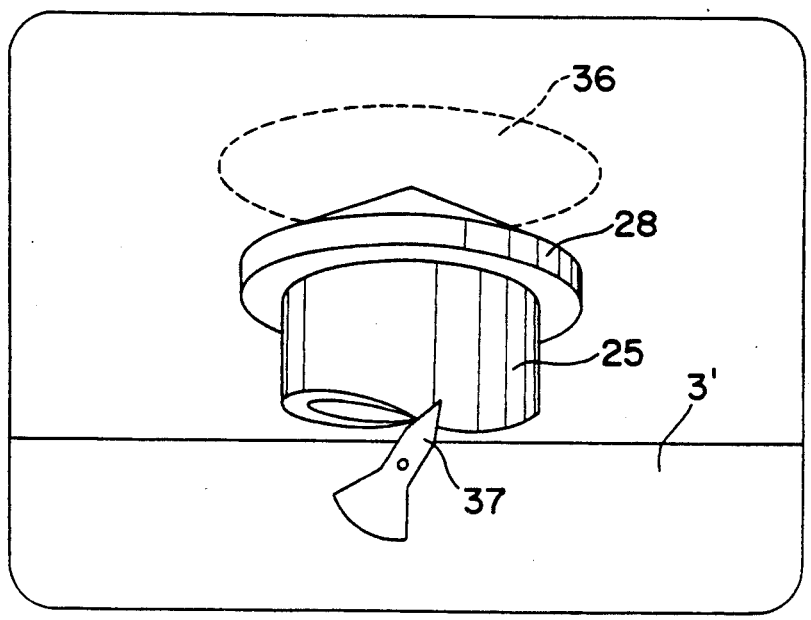
FIG. 4 shows the screen of a television camera wherein the borer is aligned with a branched portion in the pipeline.

Then, when the body 9 is turned to the left by means of the actuator 7, the television camera 8 is turned with the body 9 as an integral unit in the same direction so that the image of the upper, inner surface of the pipeline 31 is moved to the right on the screen while the position of the image of the borer 28 on the screen remains unchanged, with the result that only the image of the branched portion 36 is moved to a position as shown in FIG. 4 where its center line is aligned with that of the borer 28. Further, when the body 9 is turned, the image of the pointer 37 on the screen is turned and inclined in the opposite direction so that the posture and orientation of the boring device body 9 can be seen. Further, in case the branched portion 36 and the borer 28 get out of position with each other in the longitudinal direction of the pipeline 31 too, the actuator 7 can be actuated in the same manner as aforementioned to move the borer 28 forwards and backwards to align it with the branched portion 36. In this case too, the position of the image of the borer 28 on the screen of the television remains unchanged.

Further, during turning of the boring device body 9, it is preferable that under the condition that the outriggers 6 and 6' are thrusted against the upper, inner surface of the pipeline 31 the axis of turning of the body 9 by means of the actuator 7 is aligned substantially with the center line of the pipeline 31. By so doing, the positional relationship between the borer 28 and the inner surface of the pipeline 31 will remain unchanged when the body 9 is turned. Therefore, the center line of the borer 28 can be readily aligned with that of the branched portion 36 while observing the screen of the television, so that the boring operation can be made always in an established, stable condition.

When the hydraulic motor 10 is rotated in this condition, the gear 11 is rotated and the spindle gear 25 meshing with the gear 11 is rotated in turn so as to rotate the borer 28 fixedly secured to the spindle gear 25. Thereupon, the spindle gear 25 is moved upwards while it is being rotatively driven by means of the gear 11 thereby moving the borer 28 upwards, so that the lining material 30 blocking the branched pipeline 33 can be cut away by means of cutting blades 29 mounted on the upper surface of the borer 28 so as to form a through-hole.

After the lining material 30 has been bored or ported by means of the borer 28, the spindle gear 25 is moved downwards, and then the rotation thereof is stopped. Subsequently, the hydraulic jacks 4 and 4' are actuated to move the frames 3 and 3' downwards relative to the skid 2. As a result, the boring device 1 is unlocked from the pipeline 31. Thereafter, the boring device 1 is moved again to another branched portion in the pipeline 31 where the lining material 30 blocking it can be cut away by the same operation to form a through-hole.

According to this boring device, since the actuator 7 is moved and turned in the condition that the television camera 8 is directed to the leading end of the borer 28, the image of the borer 28 assumes always a predetermined position on the screen of the television. Therefore, when the inner surface of the pipeline 31 is investigated by means of the television camera 8 to find out the branched portion 36 and the image of the branched portion has been captured on the screen of the television, the borer 28 is always located in close vicinity of the branched portion 36 so that the center line of the borer 28 can be aligned with that of the branched portion 36 while confirming the positions of the two on the television screen. Therefore, the operation can be made very easily.

Further, if the angle, position and focal distance of the television camera 8 relative to the boring device body 9 are fixed in the condition that the camera 8 is directed rearwardly, then the image of the borer 28 on the screen of the television can always be kept at a predetermined position, and also the image of the branched portion 36 on the screen can always be kept at a predetermined position when the branched portion 36 has reached the most proper position. Therefore, the center lines of the borer and the branched portion can be aligned accurately and very easily without resorting to the perception of the operator.

In the device of the present invention, since the borer 28 comprising the cutting blades 29 mounted on the upper surface thereof is used, the lining material 30 can be cut away and into a powder or small particle shaped chips which are scattered in the pipeline and can be easily washed away with water etc. in a subsequent step. Further, since the borer 28 can be made to have a large diameter which is nearly equal to the inside diameter of the branch pipeline 33 and have a reduced height so that the upward stroke of the borer 28 during boring operation can be reduced, the boring device per se can be made compact. In the present invention, the borer 28 is not limited to this particular construction, and instead, for example, a hammer-shaped striker adapted to break the lining material covering a branched portion, a heating iron adapted to burn out the lining material, or a hole-saw type rotary cutter, etc., may be used as well.

Further, in the embodiment shown in the drawings, the television camera 8 is mounted so as to be turned freely relative to the body 9 and functions to investigate branched portions in the inner surface of the pipeline during the movement of the boring device therein and aid in positioning or alignment of the borer 28. In the present invention, however, it is also possible to fixedly secure the television camera 8 with its lens directed to the leading end of the borer 28 and mount another television camera for investigating the inner surface of the pipeline during the movement of the boring device 1.

A second boring device according to the present invention is characterized in that frames are mounted on a skid, which is movable in a pipeline, in such a manner that they can be moved up and down, and outriggers adapted to be thrusted against the upper, inner surface of the pipeline are attached to the upper parts of the frames. The boring device body is mounted on the frames in such a manner that it may be turned about an axis of turning extending in parallel with the central axis of the pipeline and may be slidably moved longitudinally of the pipeline relative to the frames. The boring device body has a rotary borer adapted to be rotated about an axis of rotation extending perpendicularly to the central axis of the pipeline and which is mounted thereon in such a manner that it may be moved vertically along the axis of rotation.

As can be seen from FIGS. 1 and 2, the basic construction of this boring device is the same as that described hereinabove with reference to the first boring device.

In FIG. 2, a gear 11 is journalled in the boring device body 9 in such a manner that it may be rotated freely through ball bearings 12 relative to the body. The gear 11 is adapted to be rotatively driven by the aforementioned hydraulic motor 10 through bevel gears 13 and 14. The gear portion 15 of the gear 11 is projected from the upper part of the boring device body 9.

The above-mentioned gear 11 has a rotating shaft 17 which extends in parallel with a piston rod 16 fixedly secured to the above-mentioned boring device body 9. The piston rod 16 has a spindle 18 which is fitted from the outside thereof so as to be slidably and freely movable in the up and down direction. An "O" ring 19 is mounted between the outer periphery of the upper end of the piston rod 16 and the inner periphery of the upper end of the spindle 18 so as to provide a seal therebetween. Further, a collar 20 is fitted in the lower end of the spindle 18 and has "O" rings 21 and 22 mounted on the lower, inner periphery and the upper, outer periphery thereof, respectively, so as to provide a seal between the collar 20 and the piston rod 16 and between the collar 20 and the spindle 18. The piston rod 16 has two fluid passages 23 and 24 formed therein. One fluid passage 23 is formed to open in the upper end surface of the piston rod 16, while the other fluid passage 24 is formed to open in one side surface of the piston rod 16 at a position below the "O" ring 19. The arrangement is made such that when fluid under pressure is supplied into either one of the passages 23 and 24 the spindle 18 can be slidably moved up or down relative to the piston rod 16.

Fitted outside of the outer periphery of the spindle 18 is a spindle gear 25 which is adapted to be turned freely through ball bearings 26 relative to the spindle 18. The spindle gear 25 has vertically extending long gear teeth 27 formed thereon substantially along the overall length thereof and which mesh with the gear portion 15 of the above-mentioned gear 11.

Fixedly secured to the upper surface of the spindle gear 25 is a rotary borer 28 having the approximately shape of a disk which is gently tapered and raised at the central part thereof. The rotary borer 28 has cutting blades 29 whose bodies are sunk in the upper part thereof.

To bore the lining material 30 covering a branched portion of the pipeline 31 by means of this device, the device 1 is inserted into the lined pipeline 31 and advanced therein by means of the rod 32 or the like. The boring device 1 is advanced while the inner surface of the pipeline 31 is being investigated by means of the television camera 8, and when the rotary borer 28 has reached nearly the position of the branched pipeline 33 the advancement of the boring device 1 is stopped. This condition is shown by solid lines in FIG. 2. In this case, it is not necessary to align the rotary borer 28 exactly with the branched portion of the main pipeline where an opening for the branched pipeline 33 is to be formed. Further, as for the means for advancing the boring device 1 in the pipeline, it is not limited to pushing it forward by means of the rod 32, and instead the boring device may be advanced by pulling it forwardly, for example, by means of a wire, etc.

Figure 5:
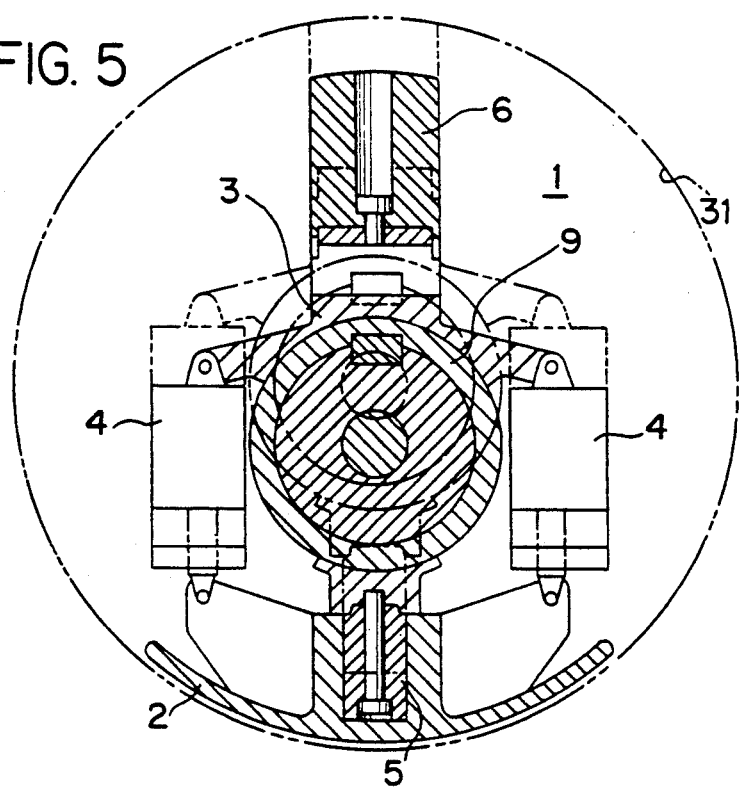
FIG. 5 is a sectional view taken along line III—III of FIG. 2.
Figure 6:
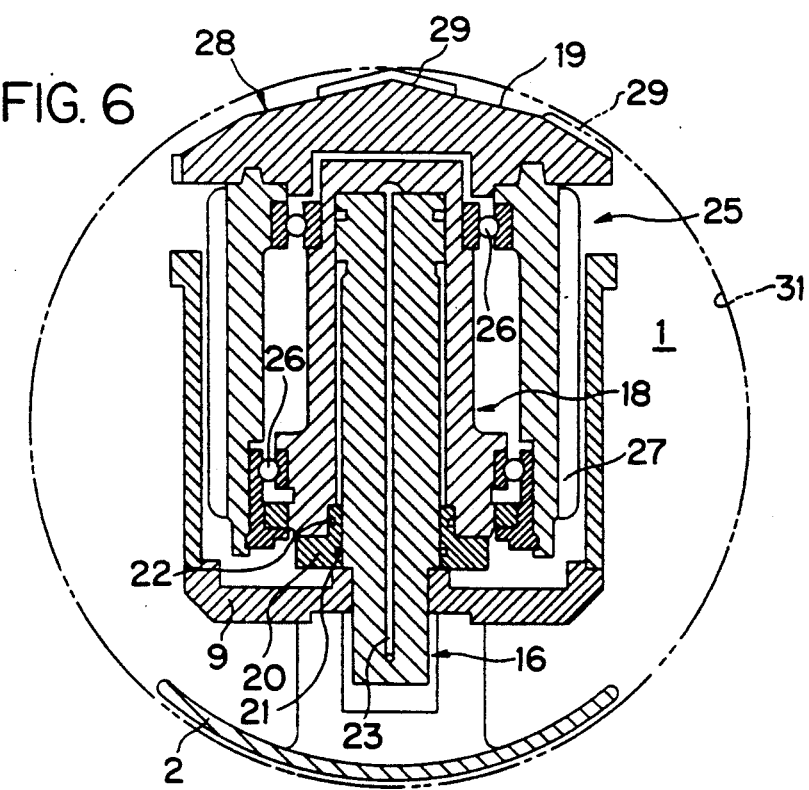
FIG. 6 is a sectional view taken along line IV—IV of FIG. 2.
Figure 9:
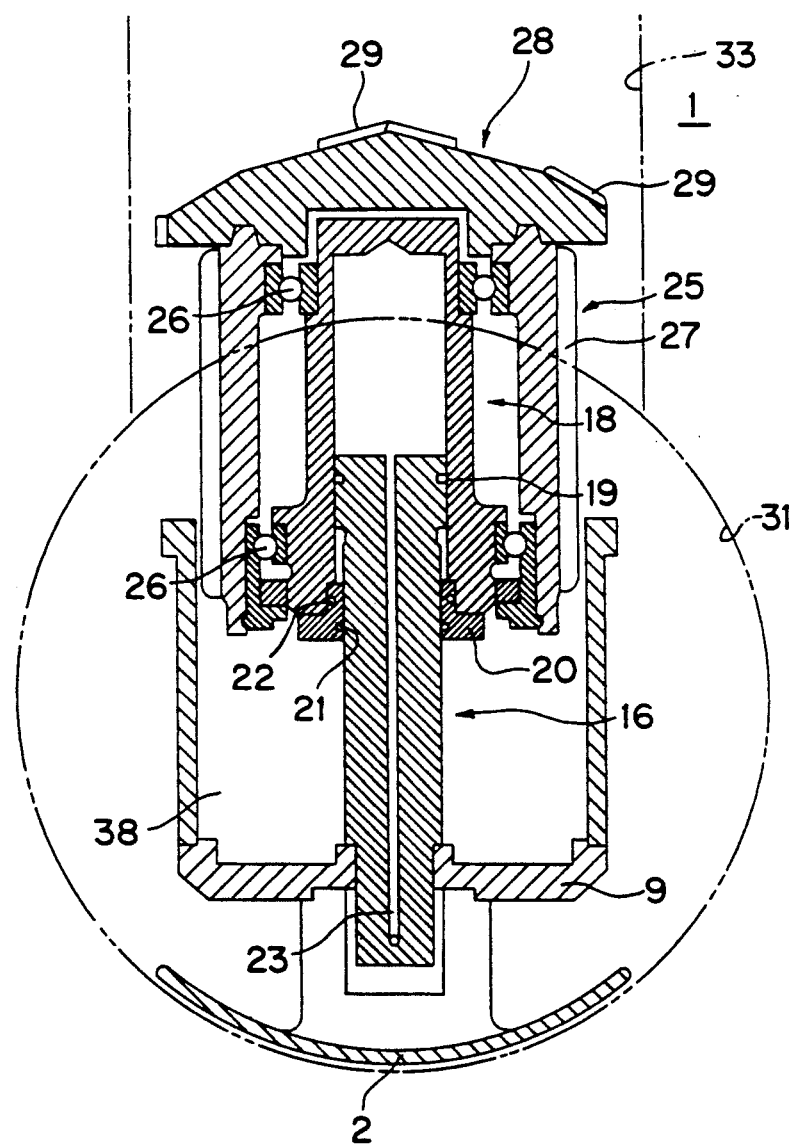
FIG. 9 is a sectional view of the borer of the boring device according to the present invention.

Then, the hydraulic jacks 4 and 4' are actuated to push up the frames 3 and 3' so as to thrust the outriggers 6 and 6' against the upper, inner surface of the pipeline 31 thereby fixedly supporting the boring device 1 relative to the pipeline 31. This condition is shown by solid lines in FIG. 1, by chain lines A in FIG. 2, and by chain lines in FIG. 5 and FIG. 6.

Subsequently, the actuator 7 is actuated to move the boring device body 9 forwardly or rearwardly as shown by chain lines B in FIG. 2. Further, FIG. 2 shows the condition of movement of the boring device body 9 from its position before the upward movement of the frames 3 and 3' takes place, relative to the skid 2.

Actually, the boring device 1 is moved upwards from a position where the frames 3 and 3' have been lifted. Further, as occasion demands, the boring device body 9 is turned relative to the frames 3 and 3' as shown in FIG. 7 so as to align substantially the center line of the rotary borer 28 with that of the branched pipeline 33. Further, it is desirable to substantially align the axis of turning of the boring device body 9 by means of the actuator 7 with the center line of the pipeline 31 in the condition that the outriggers 6 and 6' are thrust against the upper, inner surface of the pipeline 31.

When the hydraulic motor 10 is driven in this condition, the gear 11 is rotated through the bevel gears 13 and 14, and the spindle gear 25 meshing with the gear 11 is in turn, rotated thereby rotating the rotary borer 28 fixedly secured to the spindle gear 25. Thereupon, fluid under pressure is allowed to flow into the aforementioned fluid passage 23 to apply a fluid pressure between the upper surface of the piston rod 16 and the spindle 18. As a result, the spindle 18 is moved upwards relative to the piston rod 16 with the result that the spindle gear 25 is moved upwards while it is being rotatively driven by the gear 11. Further, the rotary borer 28 fixedly secured to the spindle gear 25 is also moved upwards.

The lining material 30 blocking the branched pipeline 33 is cut away by means of the cutting blades 29 mounted fixedly on the uppersurface of the rotary borer 28 so as to form a throughhole of a diameter which corresponds to the diameter of the rotary borer 28. Then, the rotary borer 28 passes through the throughhole and is advanced into the branched pipeline 33. This condition is shown by chain lines C in FIG. 2, and also in FIG. 8.

In the next step, fluid under pressure is allowed to flow into another fluid passage 24 so as to apply a fluid pressure between the outer periphery of the piston rod 16 and the inner periphery of the spindle 18. Consequently, the spindle 18 is moved downward relative to the piston rod 16 with the result that the spindle gear 25 is moved downward while it is being rotated by the gear 11, and so the rotary borer 28 is moved downward together with the spindle gear 25 to withdraw from through-hole.

Then, the hydraulic motor 10 is stopped to stop the rotation of the spindle gear 25, and then the hydraulic jacks 4 and 4' are actuated to move the frames 3 and 3' down relative to the skid 2. As a result, the boring device 1 is unlocked from the pipeline 31, and then it is moved again to another branched portion in the pipeline where the lining material 30, blocking another branched pipeline, can be bored by the same operation.

According to this boring device, since the main parts of the device is moved upwards to a boring position where the boring device 1 can be fixed to the inner surface of the pipeline 31 by means of the skid 2 and the outriggers 6 and 6', and then the lining material 30 is bored in this condition, the device 1 is maintained in a stable condition during the boring operation, and there is no fear of the device swinging or turning over by the action of the reaction force generated when the boring is conducted.

Further, since at the time of boring operation the boring device is located at its uppermost position, when the boring device is locked onto the pipeline 31, the rotary borer 28 is located sufficiently close to the inner surface of the pipeline 31. Therefore, when confirming the boring position by means of the television camera 8, the positioning of the rotary borer 28 can be easily made and the lining material can be bored easily without having to move up the rotary borer 28 excessively, and a high accuracy is obtained with regard to the position of that portion to be bored. Furthermore, even in case there are irregularities in the inner surface of the pipeline or changes in the inside diameter thereof, the spacing between the rotary borer 28 and the inner surface of the pipeline is maintained constant, and thus when the boring condition is confirmed by means of the television camera 8, the error, if any, is very small.

Further, by aligning substantially the center of turning the boring device body 9 by means of the actuator 7 with the center line of the pipeline 31 as aforementioned, the spacing between the rotary borer 28 and the inner surface of the pipeline 31 remains unchanged even when the boring device body 9 is turned, and also the lining material 30 can always be bored by means of the rotary borer 28 which is brought into contact with it at right angles thereto, and thus the boring operation can be made in a steady condition.

Further, it is preferable to use the rotary borer 28 having cutting blades 29 whose bodies are sunk in the upper part thereof as shown in the drawings, because the cut-off lining material is scattered in the form of powder or particle shaped chips in the pipeline and can be subsequently washed away by water etc. subsequently. In the device of the present invention, however, the borer is not limited to such cutting blades, and instead, for example, a hole-saw can be used. But, in this case, since the lining material is cut off in the shape of a disk by means of the hole-saw, the thus cut-off disk needs to be taken by a separate means out of the pipeline.

A third boring device according to the present invention is characterized in that the boring device body which is movable in a pipeline has a borer mounted thereon in such a manner that it may be projected and withdrawn radially of the pipeline, said borer being adapted to be rotated about an axis of rotation extending radially of the pipeline so that it may bore the lining material applied to the inner surface of the pipeline in a branched portion, said body having a cylindrical space formed therein so as to open on one side thereof, said cylindrical space accommodating an upstanding piston rod passing through the bottom thereof. A cylindrical, bottomed spindle is fitted outside of the piston rod so that it may be slidably moved longitudinally of the piston rod, the clearance between the piston rod and the spindle being sealed airtightly at both the leading end of the piston rod and the base end of the spindle. The arrangement is made such that the spindle may be slidably moved relative to the piston rod by a fluid pressure applied to the space between the leading end of the piston rod and both the sealing portions. A spindle gear is supported on the outer periphery of said spindle so that it may be rotated freely relative to the spindle, said spindle gear having gear teeth formed on the outer periphery thereof which extends along nearly the full length thereof in the axial direction. A borer is mounted on the leading end of the spindle; and a gear is mounted on one side of said body in such a manner that it can be rotatively driven by means of a hydraulic motor through a rotating shaft whose axis runs parallel with the rotation axis of said spindle gear, said gear meshing with the gear teeth of said spindle gear.

The basic construction of this boring device is, as seen from FIG. 1, the same as that described hereinabove with reference to the first and second boring devices.

Stating in detail, the body 9 has a cylindrical space 38 formed therein and a central axis which extends in parallel with the rotating shaft of the above-mentioned gear 11. An upstanding piston rod 16 passes through the central part of the bottom of the cylindrical space 38. A cylindrical, bottomed spindle 18 is fitted outside the piston rod 16 in such a manner that it may be slidably moved up and down relative to the piston rod 16. The piston rod 16, "O" ring 19, spindle 18, the collar 20, "O" rings 21, 22, the fluid passages 23, 24, the spindle gear 25 and the ball bearings 26 etc. are as described hereinabove in the explanation of the second boring device.

The operation for boring the lining material 30 applied to the inner surface of the pipeline 31 in a branched portion by using this device is the same as that described hereinabove with reference to the second boring device.

According to this boring device, the cylindrical, bottomed spindle 18 is fitted outside of the upstanding piston rod 16 which passes through the bottom of the cylindrical space 38, and the borer 28 is arranged to be projected and withdrawn through the spindle gear 25 which is moved up and down by the upward and downward movements of the spindle 18. Therefore, it is possible to make the stroke of projection and withdrawal of the borer 28 sufficiently long. Further, since the gear 11 meshes with the long gear teeth 27 formed on the outer periphery of the spindle gear 25 so that the spindle gear 25 may be rotatively driven through the gear 11, the borer 28 can be rotatively driven in a stable condition regardless of the extent of projection thereof. Accordingly, the borer 28 can be projected over a sufficiently large distance from the outer surface of the body 9 so that it may be inserted deep into the branched pipeline 33. Therefore, even in case during the lining process an adhesive made its entry into the branched pipeline 33 and solidified thereby clogging the latter, the solidified adhesive mass can be cut away by means of the borer 28 and removed therefrom.

A fourth boring device according to the present invention is characterized in that the boring device body which is movable in a pipeline comprises a rotary borer adapted to be rotated about an axis of rotation extending radially of the pipeline, said borer being mounted on the body in such a manner that it may be projected and withdrawn in the direction of the axis of rotation, said rotary borer being comprised of a centrally raised circular disk shaped rotating member having a plurality of cutting blades mounted radially on the upper surface thereof.

The basic construction of this boring device is, as can be seen from FIG. 1, the same as that of the third boring device. The rotary borer is comprised of a centrally raised and gently tapered circular disk shaped rotating member 39 having cutting blades 29 whose bodies are sunk in the upper part thereof. Each of the cutting blades 29 has a plurality of aligned approximately triangular cutting edges 40. The cutting blades 29 are mounted on the rotating members 39 radially from the center thereof. The cutting blades 29 are located in pairs and symmetrically of the center of the rotating member 39. Each pair of the cutting blades 29 can have cutting edges 40 formed in staggered relationship respect to each other.

The operation for boring the lining material 30 applied to the inner surface of the pipeline 31 in a branched portion by use of this device is the same as that given in the explanation of the above-mentioned boring device. In this fourth boring device, the lining material blocking the opening of the branched pipeline 33 to the main pipeline is cut by means of the cutting blades 29 mounted on the upper surface of the borer 28 to thereby form a through-hole whose diameter corresponds to that of the rotating member 39 of the rotary borer 28. Since the rotating member 39 has a centrally raised and gently tapered upper surface, the lining material 30 in a branched portion is bored or cut from its central portion in turn. Further, chips of the lining material 30 resulting from the cutting operation will slip down from the upper surface of the rotating member 39 so that they will not remain on the upper surface, thereby improving the boring efficiency.

Further, since, as aforementioned, the cutting edges 40 of each pair of cutting blades 29 mounted on the upper surface of the rotating member 39 are formed in staggered relationship with each other, the cutting edges 40 of the cutting blades 29 serve to complement their cutting functions to enable the lining material 30 to be cut away very efficiently and rapidly to make a through-hole.

According to this boring device, since the rotary borer 28 is comprised of a centrally raised rotating member 39 having a plurality of cutting blades 29 whose bodies are sunk in the upper part thereof, when the rotary borer 28 is rotated and brought into contact with the lining material 30, the latter can be cut by means of the cutting blades 29 to make a throughhole whose diameter corresponds to that of the rotary borer 28. Therefore, when a rotary borer 28 with a diameter which corresponds to that of the branched pipeline 33 is used, a throughhole whose diameter corresponds to that of the opening of the branched pipeline 33 can be made without damaging the pipeline 31 or the lining material 30. Further, since the rotary borer 28 is comprised of the rotating member 39 having cutting blades 29 whose bodies are sunk in the upper part thereof, the borer can be formed to have a large diameter and a low height as compared with conical drills so that the upward stroke of the rotary borer 28 when boring the lining material can be reduced thus making the entire boring device 1 compact.

According to this device, since the entire surface of the lining material 30 in a branched portion is bored by means of the cutting blades 29 whose bodies are sunk in the upper part of the rotating member 39, the thus cut up lining material in the form of fine powder or particle shaped chips will scatter in the pipeline 31, and thus there is no possibility of circular-disk shaped chips resulting from the cutting by the hole-saw remaining therein. Hence, the powder or particle shaped chips can be washed away with water etc. in the subsequent step and removed easily therefrom.

Further, a reaction-curing adhesive is generally used for applying the lining material 30 to the inner surface of the pipeline 31. However, there are cases where a part of the adhesive flows into the branched pipeline 33 due to internal pressure during the lining process and solidifies therein clogging the branched pipeline. In such cases, it is impossible to remove the solidified adhesive layer remaining in the branched pipeline 33 by means of the conventional striker type or heating iron type borer, and also it is difficult to remove it even by means of a drill or hole-saw type rotary borer. However, when a borer of the type defined by the presnet invention is used, the lining material can be bored by cutting by means of cutting blades 29, whereby the aforementioned solidified adhesive layer can be cut off and readily removed.

A fifth boring device according to the present invention is characterized in that the boring device body is supported on a skid, which is movable in a pipeline, in such a manner that it may be moved forwards and backwards and turned about an axis of rotation extending in parallel with the central axis of the pipeline, said body having a rotary borer adapted to be rotated about an axis of rotation extending radially of the pipeline and which is mounted thereon in such a manner that it may be projected and withdrawn in the direction of the axis of rotation, said rotary borer including reaming blades mounted on the lower, outer periphery thereof, the cutting edges of said reaming blades being registered substantially with the outermost peripheral edge of the borer.

Figure 10:
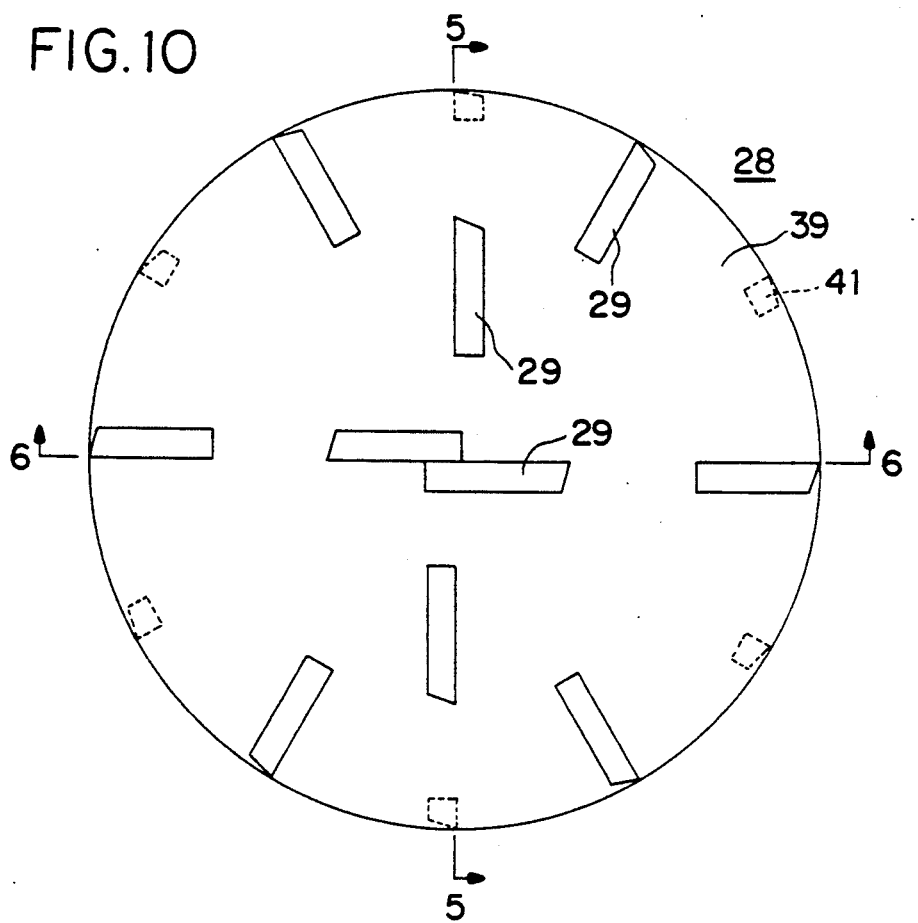
FIG. 10 is a plan view of the leading end of the borer.
Figure 11:
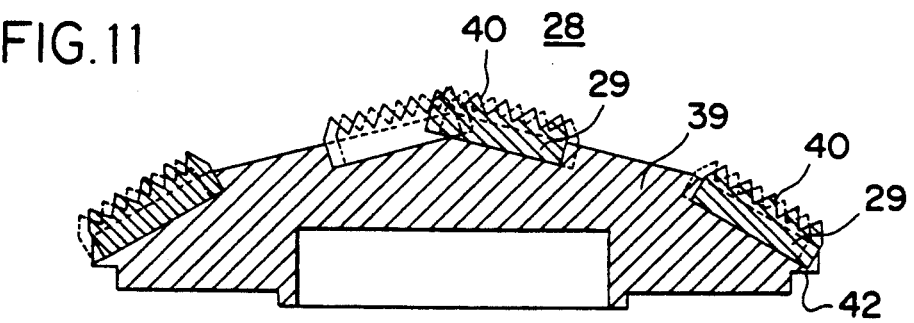
FIG. 11 is a sectional view taken along line VI—VI of FIG. 10.
Figure 12:
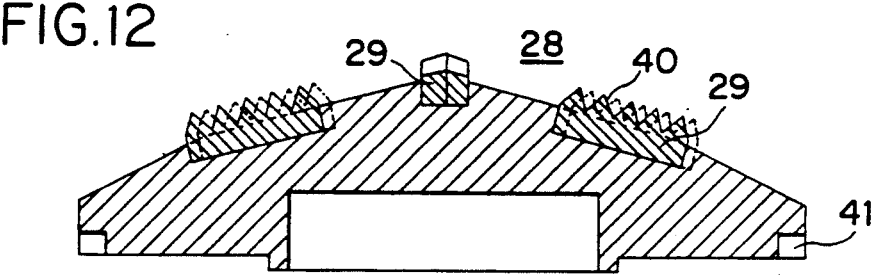
FIG. 12 is a sectional view taken along line V—V of FIG. 10.

Although the basic construction of this boring device is, as seen from FIG. 1, the same as that described hereinabove with regard to the fourth boring device, the rotary,.borer 28 has reaming blades 41 mounted on the lower, outer periphery thereof (see FIGS. 10, 11 and 12). The rotating member 39 has a small diameter stepped portion 42 formed on the lower, outer periphery thereof. The reaming blades 41 are mounted in the stepped portion 42. The cutting edges of the reaming blades 41 are registered substantially with the upper, outermost periphery of the above-mentioned stepped portion 42 in the rotating member 39.

The operation for boring the lining material 30 applied to the pipeline 31 in a branched portion by means of this boring device is the same as that described hereinabove with regard to the fourth boring device. In this fifth device, it is not necessary to align the center line of the rotary borer 28 accurately with that of the branched pipeline 33 by actuating the actuator 7 so as to move the body 9 forwards and backwards and turn it, but it is only necessary that the rotary borer 28 is located within the branched pipeline 33.

It is preferable, in this case, to align the axis of turning of the body by means of the actuator 7 substantially with that of the pipeline 31 in the condition that the outriggers 6 and 6' are thrusted against the upper part of the pipeline 31. By so doing, the positional relationship between the rotary borer 28 and the inner surface of the pipeline 31 during the turning of the body 9 remains unchanged, and therefore the boring operation can be always maintained in a stable condition.

Figure 13:
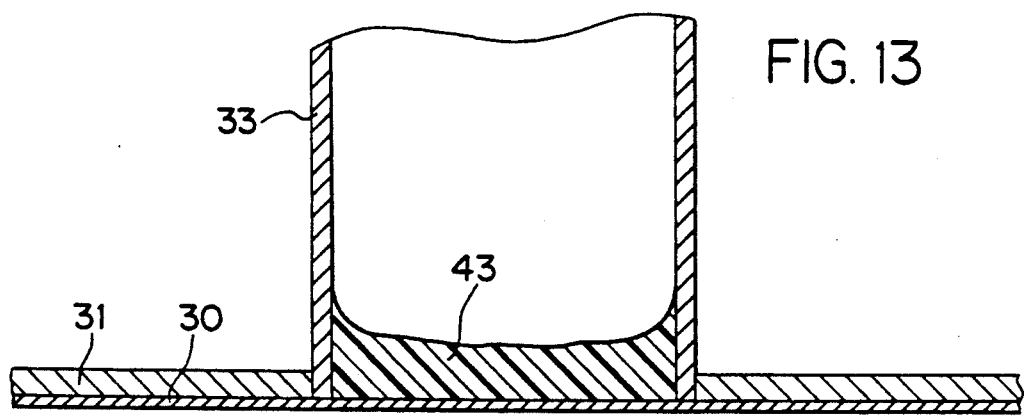
FIG. 13 is a longitudinal, sectional view of the central part of the pipeline showing the condition where the branched pipeline is blocked by a solidified adhesive layer.
Figure 14:
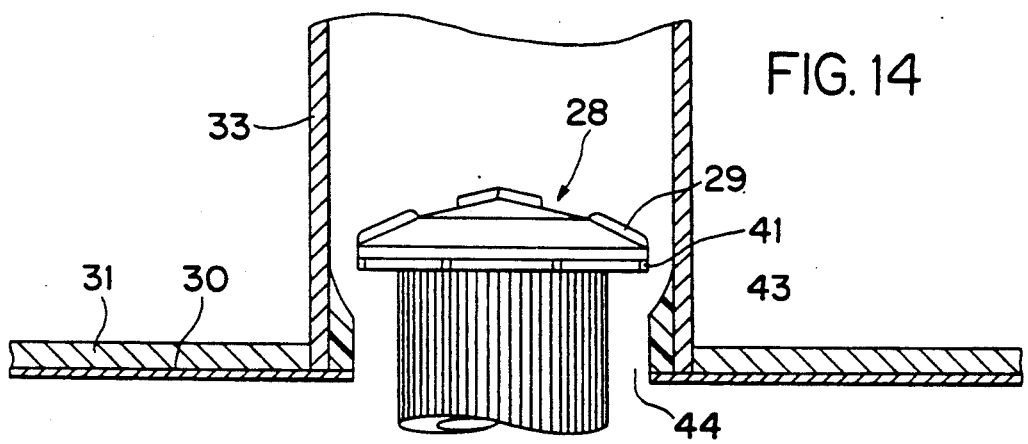
FIG. 14 is a longitudinal sectional view of the central part of the pipeline showing the condition here a solidified adhesive layer has been cut and bored by the boring device.
Figure 15:
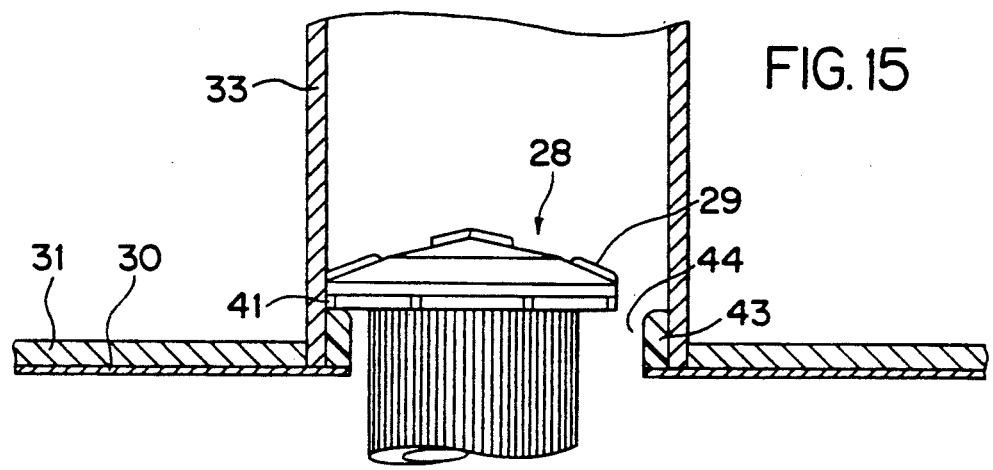
FIG. 15 is a longitudinal sectional view of the central part of the pipeline showing the condition where a through-hole is being reamed.

When the hydraulic motor 10 is driven in this condition, the gear 11 is rotated through the bevel gears 13 and 14, and the spindle gear meshing with the gear is rotated thereby rotating the rotary borer 28 fixedly secured to the spindle gear 25. Thereupon, fluid under pressure is introduced into the aforementioned fluid passage 23 so as to apply a fluid pressure in the space between the upper surface of the piston rod 16 and the spindle 18. As a result, the lining material 30 applied to the inner surface of the pipeline 31 in a branched portion can be cut off or bored evenly by means of the rotary borer 28 composed of the centrally raised and gently tapered rotating member 39 having cutting blades 29 whose bodies are sunk in the upper part thereof. Further, in case an adhesive made its entry into the branched pipeline 33 and solidified there (Refer to FIG. 13), the rotary borer 28 cuts and penetrates through the solidified adhesive layer 43 and is advanced into the branched pipeline 33 as shown in FIG. 14.

Further, by forming the cutting edges 40 of each pair of the cutting blades 29 in staggered relationship with each other on the upper surface of the rotating member 39, the cutting edges 40 of the cutting blades 29 function to complement each other so that the lining material 30 can be efficiently and rapidly cut to make a through-hole.

When the rotary borer 28 has penetrated through the lining material 30 and the solidified adhesive layer 43 thereby forming a through-hole 44, the actuator 7 is actuated to move the body 9 forwards and backwards and turn it so as to allow the rotary borer 28 to swing inside the branched pipeline 33. As a result, the solidified adhesive layer 43 and the lining material 30 around the through-hole 44 is cut by means of the reaming blades 41 to enlarge the through-hole 44, and also the upper part of the stepped portion 42 is brought into contact with the inner surface of the branched pipeline 33 so as to cut the inner surface by means of the reaming blades 41, without damaging it.

Then, the pressurized fluid in the above-mentioned fluid passage 23 is discharged and pressurized fluid is introduced into the other fluid passage 24 while the solidified adhesive layer 43 and the lining material 30 are being cut off by means of the reaming blades 41 so that a fluid pressure is applied between the outer periphery of the piston rod 16 and the inner periphery of the spindle 18. As a result, the spindle 18 is moved downwards relative to the piston rod 16 with the result that the spindle gear 25 is moved downwards while it is being rotated, and accommodated again in the cylindrical space 38. Further, the rotary borer 28 is moved together with the spindle gear 25 so as to progressively move the cutting position by means of the reaming blades 41 from the interior of the branched pipeline 33 towards the opening thereof, thereby completely removing the adhesive layer 43 and making the diameter of the through-hole made in the lining material 30 equal to the inside diameter of the branched pipeline 33. Subsequently, if the rotary borer 28 is moved further downwards, then it can be removed from the through-hole 44 thereby finishing the boring operation.

Subsequently, the hydraulic motor 10 is stopped to stop the rotation of the spindle gear 25, and then hydraulic jacks 4 and 4' are actuated to move the frames 3 and 3' down relative to the skid 2. Consequently, the boring device 1 is unlocked from the pipeline 31, and then it is again moved to the next branched portion in the pipeline 31 where the lining material 30 can be bored by the same operation.

According to the present device, since the rotary borer 28 has the reaming blades 41 mounted on the outer periphery thereof and the edges of the reaming blades 41 are located substantially in registration with the outermost periphery of the rotary borer 28, the swinging of the rotary borer 28 inside the branched pipeline 33 enables the lining material 30 to be cut by means of the reaming blades 41 to enlarge the through-hole to a diameter equal to the inside diameter of the branched pipeline 33. Further, in case, as aforementioned, the adhesive made its entry into the branched pipeline 33 during the lining process and solidified to form the cured adhesive layer 43 thereby reducing the bore of the opening of the branched pipeline 33, the adhesive layer 43 can be cut off by means of the reaming blades 41 thus completing the opening. Furthermore, since the rotary borer 28 has the reaming blades 41 mounted only on the lower, outer periphery thereof and is not provided with reaming blades 41 on the upper, outer periphery thereof, and also since the cutting edges of the reaming blades 41 are substantially aligned with the outermost periphery of the rotary borer 28, when the rotary borer 28 is swung to cut off the solidified adhesive layer 43, there is no possibility of the inner surface of the branched pipeline 33 being cut or damaged by the reaming blades 41 and also there is no fear of the pipeline 31 or the branched pipeline 33 being damaged thereby. In case, as mentioned above, the rotary borer 28 composed of a rotating member 39 having the cutting blades 29 whose bodies are sunk in the upper part thereof is used, the cut-off lining material is scattered in the form of powder or particle shaped chips in the pipeline 31 and can be washed away easily with water etc. in a subsequent step. Further, since the rotary borer 28 can be made to have a large diameter which is nearly equal to the inside diameter of the branched pipeline 33 and have a reduced height, the upward stroke of the rotary borer 28 in boring the lining material can be reduced so that the entire boring device can be made compact. However, this rotary borer 28 is not limited to the construction as shown in the drawings, and instead, for example, a hole-saw type borer having reaming blades 41 mounted on the outer periphery thereof may be used.

the invention being thus described, it will be obvious that the same may be varied in many ways. Such variations are not to be ragarded as a departure from the spirit and scope of the invention, and all such modifications as would be obvious to one skilled in the art are intended to be included within the scope of the following claims.

What is claimed is:

1. A boring device for removing a lining material applied to the inner surface of a pipeline and which covers a branched portion of said pipeline, said boring device comprising:
   a body member mounted on associated frame members which in turn are supported on a skid member which is disposed to be sidably movable along the inner surface of the pipeline in the longitudinal direction thereof,
   outrigger members attached to said frame members,
   means for moving said body member, frame members and associated outrigger members in the up and down direction, radially of the pipeline, whereby said outrigger members are adapted to be thrust against the upper, inner surface of the pipeline thereby securing the boring device against the inner surface of the pipeline,
   actuator means operatively connected to said frame members for turning said body member about its axis of rotation which extends in parallel with the central axis of the pipeline, and
   a rotary borer means adapted to be rotated about an axis of rotation which extends in a direction perpendicular to the central axis of the pipeline, said rotary borer means being mounted to be slidably moveable along the axis of rotation.

2. The boring device of claim 1 wherein, when said outrigger members engage the inner surface of the pipeline by moving said frame members and said body member radially upward relative to said skid, the axis of turning of said body member relative to said frame members is substantially aligned with the central axis of the pipeline.

3. The boring device of claim 1 wherein said rotary borer means is mounted to be selectively projected and withdrawn in the direction of its axis of rotation, said rotary borer means comprising a centrally raised circular disk-shaped rotating member provided with a plurality of cutting blades radially mounted on the upper surface thereof.

4. The boring device of claim 3 wherein said cutting blades comprise pairs of radially aligned, substantially triangular cutting edges, each pair of cutting blades having cutting edges which are formed in staggered relationship with respect to each other.

5. The boring device of claim 4 wherein the underside of the borer means is provided at its periphery with stepped portions which contain reaming blades.

6. The boring device of claim 1 wherein the underside of the borer means is provided at its periphery with stepped portions which contain reaming blades.

7. A boring device for removing a lining material applied to the inner surface of a pipeline and which covers a branched portion of said pipeline, said boring device comprising:

a body member supported by a skid member which is disposed to be slidably movable along the inner surface of the pipeline in the longitudinal direction thereof, said body member having a leading end and a trailing end, defining a cylindrical space which opens at one side of the body member, an upstanding piston rod, having a leading end and a trailing end, disposed in said cylindrical space and passing through said body member, an actuator means for moving said body member forward or backward relative to the skid member and turning said body member about its axis of rotation which extends in parallel with the central axis of the pipeline, a borer means mounted on said body member, a means for selectively projecting and withdrawing said borer means radially of the pipeline, and relative to the body member, and a television camera mounted on the body member so as to be moved and turned as an integral unit with the body member, said television camera being provided with a lens which is directed toward the leading end of said borer member, a cylindrical, bottom spindle, having a base end and a second end, fitted outside the piston rod and slidably movable longitudinally of the piston rod, a clearance between the piston rod and the spindle formed with an airtight seal at both the leading end of the piston rod and the base end of the spindle, the arrangement being such that the spindle may be slidably moved relative to the piston rod by a fluid pressure applied to the space between the leading end of the piston rod and both sealed portions, a spindle gear supported on the outer periphery of said spindle for free rotation relative to the spindle, said spindle gear having gear teeth formed on the outer periphery thereof which extend along substantially the entire length thereof in the axial direction, wherein said borer being mounted on the leading end of the spindle, a gear mounted on one side of said body, and a hydraulic motor and associated rotating shaft provided for rotatively driving said gear, said rotating shaft having an axis which runs parallel with the rotational axis of said spindle gear, said gear meshing with the gear teeth of said spindle gear.

* * * * *